(12) United States Patent
Liu

(10) Patent No.: US 11,644,085 B2
(45) Date of Patent: May 9, 2023

(54) REDUCER FOR HIGH PRECISION CONTROL

(71) Applicant: SUZHOU HUAZHEN INDUSTRY RV REDUCER CO., LTD., Jiangsu (CN)

(72) Inventor: Weiwei Liu, Jiangsu (CN)

(73) Assignee: SUZHOU HUAZHEN INDUSTRY RV REDUCER CO., LTD., Suzhou (CN)

( * ) Notice: Subject to any disclaimer, the term of this patent is extended or adjusted under 35 U.S.C. 154(b) by 0 days.

(21) Appl. No.: 17/529,236

(22) Filed: Nov. 17, 2021

(65) Prior Publication Data
US 2022/0074466 A1 Mar. 10, 2022

Related U.S. Application Data

(63) Continuation of application No. PCT/CN2020/078192, filed on Mar. 6, 2020.

(30) Foreign Application Priority Data

May 22, 2019 (CN) .......................... 201910474520.9
Dec. 31, 2019 (CN) .......................... 201911401063.7

(51) Int. Cl.
*F16H 1/32* (2006.01)
*F16H 55/17* (2006.01)
(Continued)

(52) U.S. Cl.
CPC ............... *F16H 1/32* (2013.01); *F16H 55/17* (2013.01); *F16H 57/023* (2013.01); *F16H 57/08* (2013.01);
(Continued)

(58) Field of Classification Search
CPC .......... F16H 1/32; F16H 55/17; F16H 57/023; F16H 57/08; F16H 2001/323; F16H 2001/327; F16H 2057/085
See application file for complete search history.

(56) References Cited

U.S. PATENT DOCUMENTS 5,045,034 A * 9/1991 Almeda, Jr. ............. B25J 9/103
475/5
6,761,660 B2 * 7/2004 Lim .......................... F16H 1/32
475/179
(Continued)

FOREIGN PATENT DOCUMENTS

CN 104500660 A * 4/2015 ............... F16H 1/32
CN 108036027 A * 5/2018
(Continued)

OTHER PUBLICATIONS

Xiaolu Zhu, Handbook of Gear Design, Jan. 2005, p. 804, Chemical Industry Press, Beijing, China.
(Continued)

*Primary Examiner* — Sherry L Estremsky

(57) ABSTRACT

A reducer for high precision control includes a pin gear housing and two-stage reduction components disposed therein: a first-stage reduction component including an input shaft, a sun gear and a planet gear; and a second-stage reduction component including 2-3 eccentric shafts distributed uniformly, cycloidal gears, a pin, a left rigid disk and a right rigid disk, and bearings, wherein the cycloidal gears are supported by bearings on two eccentric sections of the eccentric shaft, shaft extensions on two sides of the eccentric section of the eccentric shaft are supported by bearings on the left rigid disk and the right rigid disk, and the left rigid disk and the right rigid disk are supported by bearings in inner holes of two sides of the pin gear housing.

3 Claims, 1 Drawing Sheet

(51) Int. Cl.
    *F16H 57/023*    (2012.01)
    *F16H 57/08*    (2006.01)
(52) U.S. Cl.
    CPC .. *F16H 2001/323* (2013.01); *F16H 2001/327* (2013.01); *F16H 2057/085* (2013.01)

(56) References Cited

U.S. PATENT DOCUMENTS

| | | | |
|---|---|---|---|
| 8,033,942 B2 * | 10/2011 | Tesar | H02K 7/116 |
| | | | 475/179 |
| 11,365,786 B2 * | 6/2022 | Fecko | F16H 3/70 |

FOREIGN PATENT DOCUMENTS

| | | | | |
|---|---|---|---|---|
| CN | 108843748 A | * | 11/2018 | |
| CN | 108869644 A | | 11/2018 | |
| CN | 108980285 A | | 12/2018 | |
| DE | 102011112177 B4 | * | 2/2017 | ............ F16C 19/546 |
| WO | WO-2010119631 A1 | * | 10/2010 | ............... F16H 1/32 |
| WO | WO-2014006833 A1 | * | 1/2014 | ............... F16H 1/32 |
| WO | WO-2014030292 A1 | * | 2/2014 | ............... F16H 1/32 |
| WO | WO-2018180184 A1 | * | 10/2018 | ............... F16H 1/32 |
| WO | WO-2019090900 A1 | * | 5/2019 | ............... F16H 1/32 |

OTHER PUBLICATIONS

Weidong He et al., Study on time-varying meshing stiffness of RV transmission cycloid gear based on ANSYS, Journal of Dalian Jiaotong University, Apr. 2017, pp. 55-56, vol. 38, No. 2.
Meng Li, Research and Design of Small and Medium Power Case-Fixed RV-E Type Reducer, A thesis submitted for Master Degree at Harbin Institute of Technology, Jul. 2012, p. 41.
Ying Xi et al., Analysis of teeth clearances in robotic high precision RV reducer based on ADAMS, Chinese Journal of Construction Machinery, Dec. 2015, pp. 515-516, vol. 13, No. 6.
Wentao Wang, Thermal-structural coupling analysis of RV reducer, A thesis submitted for Master Degree in Mechanical Engineering at North University of Technology, Apr. 26, 2016, pp. 3, 17 and 35.
Zejiu Liu, Rolling bearing application manual, Jan. 2006, p. 891.
Su-Ran Cai et al., Sealing Technology of sealed deep groove ball bearing, Bearing, 2009, No. 5.
Eisman et al., Design and Application Manual for Rolling Bearings, May 1985, p. 221, Huazhong Institute of Technology, Wuchang, Hubei, China.
International Search Report of PCT Patent Application No. PCT/CN2020/078192 dated May 12, 2020.

\* cited by examiner

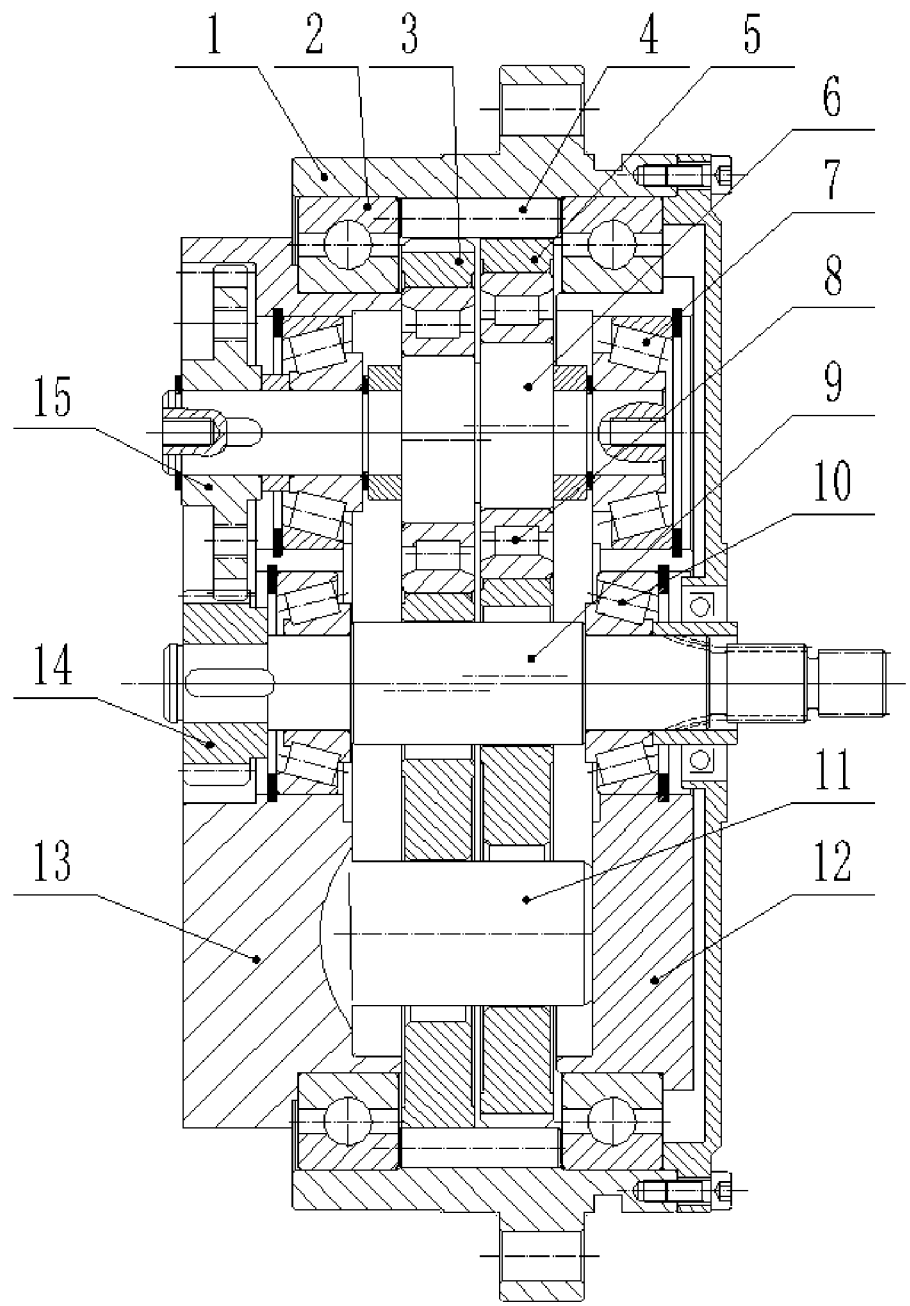

REDUCER FOR HIGH PRECISION CONTROL

CROSS REFERENCE TO RELATED APPLICATIONS

The present application is a Continuation Application of PCT Application No. PCT/CN2020/078192 filed on Mar. 6, 2020, which claims the benefit of Chinese Patent Application No. 201910474520.9 filed on May 22, 2019 and No. 201911401063.7 filed on Dec. 31, 2019. All the above are hereby incorporated by reference in their entirety.

BACKGROUND

The present disclosure relates to the technical field of industrial robot reducers and in particular to a reducer for high precision control with good dynamic characteristics.

SUMMARY

Robots are deemed as a lustrous pearl on the top of a crown in the manufacture industry and also serve as an important mark representing the level of scientific innovation and high-end manufacturing industry of a country. However, joints of most robots in China are equipped with Japanese RV reducers.

Domestic RV reducers are deficient in that temperature rise is high; wear is serious; the service life is short; and dynamic characteristics are poor during running. The poor dynamic characteristics are caused by that:

(I) Domestic researchers lack research on the theoretical foundation for rational meshing backlashes in modification of cycloidal gears.

As pointed out in Page 804 of Handbook of Gear Design: "As proved by theories and practice, through modification with a positive equidistant-positive radial moving combination, the following ideal tooth profiles can be obtained: (1) Rational meshing backlashes and radial gaps can be formed, which not only can compensate actual errors in manufacture and installation, but can also ensure sufficient numbers of simultaneous meshing teeth; (2) working parts of the tooth profiles approach conjugated tooth profiles, thereby ensuring stable transmission; (3) grinding processes are simple." As verified in literature retrieval, there is no discussion on rational meshing backlashes in modification of cycloidal gears in China.

(II) As illustrated by physics, a rational meshing backlash is closely correlated with a thermal expansion amount of a cycloidal gear.

Domestic scholars have done little research on thermal-structural coupling of RV reducers. Grease lubrication and thermal dissipation conditions of reducers are not good. During running, various conditions are closely correlated with thermal conditions. Hence, it is necessary to consider effects of temperature on volumes of parts, so as to avoid these parts from getting stuck after expanding under high temperatures.

As illustrated in physics, solids have the same expansion law in different directions, so that the body expansion of a solid can be characterized by its linear expansion law in one direction. Hence, it is concluded that a radial gap and two backlashes $\Delta c$ formed between a pin and a tooth socket of a cycloidal gear should be closely correlated with the thermal expansion amount $\lambda$ of the cycloidal gear when the reducer is working under a rated torque.

(III) Modification with a negative equidistant-negative radial moving combination adopted by domestic researchers has a potential deadly characteristic, namely the backlash $\Delta c$ is far smaller than the thermal expansion amount $\lambda$ of the cycloidal gear.

Exemplified as follows:

(example 1) Parameters of *Research on . . . Meshing Rigidity of RV Transmission Cycloidal Gear Based on . . .* by Professor x, Dalian Jiaotong University, April 2017: RZ=77, e=1.50, Za=39, K1=0.7792, $\Delta rz$=−0.022, $\Delta RZ$=−0.027 and return difference=0.60', when return difference=0.60' and radial gap=0.05 (mm): backlash $\Delta c$=0.003 (mm) (too small);

(example 2) In Design *Research of Housing Fixed RV-E Reducers of Medium-small Power* by Harbin Institute of Technology, RV-450E: RZ=155, e=3.0, Za=37, K1=0.7355, $\Delta rz$=−0.015, $\Delta RZ$=−0.03, return difference=0.33', when return difference=0.33', radial gap=0.116 (mm): backlash $\Delta c$=0.007 (mm) (too small);

(example 3) Parameters of RV-40E in *Research on Gear Gaps of RV Reducers for High Precision based on . . .* by Professor x, Tongji University: RZ=64, e=1.30, Za=39; K1=0.8125, $\Delta rz$=−0.002, $\Delta RZ$=−0.008, return different=0.36', when return difference=0.36', radial gap=0.045 (mm): backlash $\Delta c$=0.003 (mm) (too small).

SUMMARY

The present disclosure aims to propose a relational expression between a meshing backlash $\Delta c$ of rational modification of a cycloidal gear and a thermal expansion amount $\lambda$ and provide a reducer for high precision control with good dynamic characteristics so as to solve defects of heat emission and a short service life during running in the background art.

Technical solution of the present disclosure: a reducer for high precision control comprises a pin gear housing and two-stage reduction components disposed inside:

a first-stage reduction component comprising an input shaft, a sun gear and a planet gear; and a second-stage reduction component comprising 2-3 eccentric shafts distributed uniformly, cycloidal gears, a pin, a left rigid disk and a right rigid disk, wherein the cycloidal gear is modified and thus a radial gap and two backlashes are formed between the pin and a tooth socket of the cycloidal gear, the backlash satisfies $\Delta c$=(0.7-5)$\lambda$ (mm), and $\lambda$ denotes a thermal expansion amount of the cycloidal gear when the reducer works under a rated torque:

$\lambda$=(d0 $\Delta$t) $\alpha$=0.00062d0 (mm), where:

a thermal expansion coefficient of bearing steel satisfies $\alpha t$=1.379·$10^{-5}$ (1/° C.), d0 is an average diameter of the cycloidal gear and a temperature rise $\Delta t$=45° C.

In a preferable embodiment of the present disclosure, the backlash between the pin and the tooth socket of the cycloidal gear $\Delta c$=(0.8-3)$\lambda$ (mm).

In a preferable embodiment of the present disclosure, the backlash between the pin and the tooth socket of the cycloidal gear $\Delta c$=(0.9-2)$\lambda$ (mm).

In a preferable embodiment of the present disclosure, the backlash between the pin and the tooth socket of the cycloidal gear $\Delta c$=(1-1.4)$\lambda$ (mm).

In a preferable embodiment of the present disclosure, the backlash between the pin and the tooth socket of the cycloidal gear $\Delta c \approx 1.1\ \lambda$ (mm).

In a preferable embodiment of the present disclosure, the cycloidal gear is modified by a 'positive equidistant-positive radial moving' combination.

In a preferable embodiment of the present disclosure, the third bearing is a single-row radial thrust ball bearing with sealing or a thin-wall seal four-point contact ball bearing or a thin-wall seal crossed roller bearing, which can bear radial loads, two-way thrust loads and capsizing moments.

The present disclosure has the following beneficial effects:

(1) The backlash Δc generated through modification with the equidistant-radial moving combination in the present disclosure is closely correlated with the thermal expansion amount λ of the cycloidal gear, so that dynamic characteristics are good: overheating is avoided during running and working under rated loads;

(2) A domestic machine tool in the present disclosure has conventional manufacture precision, simple processes and low cost; and (3) External dimensions of the reducer in the present disclosure are the same as those of RV reducers of Nabtesco, Japan, so these two types of reducers can be mutually replaced.

DESCRIPTION OF DRAWINGS

In order to clearly illustrate the technical solution in the embodiments of the present disclosure, the accompanying drawings used in description of the embodiments will be briefly introduced. It is apparent that the accompanying drawings described below only involve some embodiments of the present disclosure. Those of ordinary skill in the art, without making creative effort, can obtain other structural forms according to these accompany drawings.

The sole FIGURE is a schematic diagram of a structural profile of a preferable embodiment of the present disclosure;

Where: 1. Pin gear housing, 2. Third bearing, 3. Left cycloidal gear, 4. Pin, 5. Right cycloidal gear, 6. Eccentric shaft, 7. Second bearing, 8. First bearing, 9. Input shaft, 10. Fourth bearing, 11. Flange, 12. Right rigid disk, 13. Left rigid disk, 14. Sun gear, and 15. Planet gear.

DETAILED DESCRIPTION

Next, the technical solutions in embodiments of the present disclosure will be described clearly and completely.

As shown in the sole FIGURE, the embodiment of the present disclosure comprises:

A reducer for high precision control comprises a pin gear housing 1 and two-stage reduction components disposed therein: a first-stage reduction component comprising an input shaft 9, a sun gear 14 and a planet gear 15; and a second-stage reduction component comprising 2-3 eccentric shafts 6 distributed uniformly, cycloidal gears, a pin 4, a left rigid disk 13 and a right rigid disk 12, wherein the cycloidal gears comprise a left cycloidal gear 3 and a right cycloidal gear 5, a shaft extension end of the eccentric shaft 6 is connected to the planet gear 15, two eccentric sections of the eccentric shaft 6 are provided with a first bearing 8 which is used for supporting the cycloidal gears, shaft extensions on two sides of the eccentric section are supported by second bearings 7 in peripheral holes of the left rigid disk 13 and the right rigid disk 12 respectively, the left rigid disk 13 and the right rigid disk 12 are supported by third bearings 2 in inner holes of two sides of the pin gear housing 1 respectively, the input shaft 9 is supported by fourth bearings 10 in center holes of the left rigid disk 13 and the right rigid disk 12 respectively, flanges 11 are uniformly distributed on the left rigid disk 13, and penetrate corresponding holes in the cycloidal gears to connect with the right rigid disk 12 by screws and positioning pins and form a rigid body, the cycloidal gears are modified by an equidistant-radial moving combination, and by the modification, a radial gap and two backlashes Δc are formed between the pin 4 and a tooth socket of the cycloidal gear, and the backlash Δc=(0.7-5)λ (mm), where: a thermal expansion amount of the cycloidal gear when the reducer works under a rated torque: $\lambda=(d0 \Delta t)$ $\alpha t=0.00062 d0$ (mm), a thermal expansion coefficient of bearing steel $\alpha t=1.379 \cdot 10^{-5}$ (1/° C.), d0 is an average diameter of the cycloidal gear, and a temperature rise $\Delta t=45°$ C.

The backlash Δc is correlated with factors such as processing precision of a pin adjacent spacing, processing precision of a pin diameter, a fitting spacing between the pin and a half-embedded hole, a pitch deviation of the cycloidal gear and deviations generated from assembly. It is correlated with the model of RV reducer. The backlash Δc that is too small can easily lead to heat generation, while a too large backlash and a slightly high rotation rate can easily lead to vibration.

*Thermal-structural Coupling Analysis of RV Reducer* of North China University of Technology (June 2016) recites: "there are rarely domestic studies on thermal-structural coupling of RV reducers. Grease lubrication is used in reducers, leading to poor heat dissipation conditions, while different conditions in running are closely correlated with heat. It is necessary to consider effects of temperature on volumes of parts, so as to prevent the parts from getting stuck due to expansion under excessive temperatures. Cycloidal gears serve as a main source for heat."

The backlash between the pin 4 and the tooth socket of the cycloidal gear Δc=(0.8-3)λ (mm).

The backlash between the pin 4 and the tooth socket of the cycloidal gear Δc=(0.9-2)λ (mm).

The backlash between the pin 4 and the tooth socket of the cycloidal gear Δc=(1-1.4)λ (mm).

The backlash between the pin 4 and the tooth socket of the cycloidal gear Δc≈1.1 λ (mm). Bases are sourced from the following table:

|  | RV-20E | RV-40E | RV-80E | RV-110E | RV-160E | RV-320E | RV-450E |
| --- | --- | --- | --- | --- | --- | --- | --- |
| Average diameter of the cycloidal gear d0 | 104 | 128 | 164 | 184 | 204 | 229 | 310 |
| (Thermal expansion + compensation) λ | 0.077 | 0.096 | 0.122 | 0.138 | 0.152 | 0.176 | 0.232 |
| Theoretical value of backlash Δc | 0.083 | 0.101 | 0.133 | 0.152 | 0.159 | 0.186 | 0.248 |
| Δc ≈ 1.1 λ | 1.08 | 1.05 | 1.09 | 1.1 | 1.05 | 1.06 | 1.07 |

It should be noted that when the backlash $\Delta c$ is too small, thermal expansion between the cycloidal gear and the pin 4 during loaded running leads to noise increase, wear, vibration and decrease of the service life.

The cycloidal gear is modified by a 'positive equidistant-positive radial moving' combination. Acting force between the cycloidal gear modified by the positive equidistant-positive radial moving combination and the pin is 49% that of a negative equidistant-positive radial moving combination; bearing force of the positive equidistant-positive radial moving combination is 1.71 times that of the negative equidistant-negative radial moving combination. The return difference of the positive equidistant-positive radial moving combination is reduced to satisfy a design requirement based on an anti-backlash principle.

Equidistant modification: a gear grinding radius increases to a positive equidistance; on the contrary, it decreases to a negative equidistance;

Radial moving modification: it is a positive radial moving when a grinding gear moves away from the center of a working table; on the contrary, it is a negative radial moving when the grinding gear moves towards the center.

The third bearing 2 is a single-row radial thrust ball bearing with sealing or a thin-wall seal four-point contact ball bearing, which can bear radial loads, two-way thrust loads and capsizing moments, so that a main machine structure is simplified and the clearance can be adjusted very easily. The third bearing may also be a thin-wall seal crossed roller bearing. Because of linear contact between a roller bearing and a roller path, a load capacity thereof is 5-15 times of the rated load of a ball bearing, so that the reliability is high and the service life is long. Through application of pre-loads by the crossed roller bearing, rigidity and rotation precision can be increased effectively.

The bearing with sealing is adopted to increase the service life of the bearing, the basis thereof can be found below:

(1) "Poor lubrication is a main cause leading to early-stage damage of bearings" (Liu Zejiu, *Application Manual of Rolling Bearings*, Page 891);

(2) "Early-stage failure of bearings is usually not caused by the fatigue damage caused by materials, but it is caused by that lubricating grease gradually goes bad after pollutants enter the bearing and then pressing marks are generated on a rolling contact face." (*Sealing Technology of Seal Deep Groove Ball Bearings*, Bearing, May, 2009);

(3) "In case of a compact structure, it is better to use a radial ball bearing mounted with two faces of sealing. Lubricating grease enough for a whole service period of the bearing is already loaded in the radial ball bearing mounted with two faces of sealing rings." (*Design and Application Manual of Rolling Bearings*, Eiseman, Page 221).

The reducer for high precision control provided by the present disclosure, compared with the prior art, has the following advantages:

(1) The backlash $\Delta c$ generated through modification with the equidistant-radial moving combination in the present disclosure is closely correlated with the thermal expansion amount $\lambda$ of the cycloidal gear, so that dynamic characteristics are good: overheating is avoided during running and working under rated loads;

(2) A domestic machine tool in the present disclosure has conventional manufacture precision, simple processes and the lowest cost, so suppression from the Japanese companies by lowering down the price will not pose a threat;

(3) External dimensions of the reducer in the present disclosure are the same as those of RV reducers of Nabtesco, Japan, so these two types of reducers can be mutually replaced.

Above descriptions are only the embodiments of the present disclosure and do not intend to limit the patent scope of the present disclosure. Equivalent structures or equivalent process conversions made based on the descriptions of the present disclosure or those directly or indirectly applied in other related technical fields are similarly involved in the patent protection scope of the present disclosure.

What is claimed is:

1. A reducer for high precision control, comprising a pin gear housing (1) and two-stage reduction components disposed inside: a first-stage reduction component comprising an input shaft (9), a sun wheel (14) and a planet gear (15); and a second-stage reduction component comprising 2-3 eccentric shafts (6) distributed uniformly, cycloidal gears, a pin (4), a left rigid disk (13) and a right rigid disk (12), wherein the cycloidal gears comprise a left cycloidal gear (3) and a right cycloidal gear (5), a shaft extension end of an eccentric shaft (6) is connected to the planet gear (15), two eccentric sections of each eccentric shaft (6) are provided with a first bearing (8) which is used for supporting the cycloidal gears, shaft extensions on two sides of the eccentric section are supported by second bearings (7) in peripheral holes of the left rigid disk (13) and the right rigid disk (12) respectively, the left rigid disk (13) and the right rigid disk (12) are supported by third bearings (2) in inner holes of two sides of the pin gear housing (1) respectively, the input shaft (9) is supported by fourth bearings (10) in center holes of the left rigid disk (13) and the right rigid disk (12) respectively, flanges (11) are uniformly distributed on the left rigid disk (13), and penetrate corresponding holes in the cycloidal gears to connect with the right rigid disk (12) by screws and positioning pins and form a rigid body, the cycloidal gears are modified by an equidistant-radial moving combination, and by modification, a radial gap and two backlashes $\Delta c$ are formed between the pin (4) and a tooth socket of each cycloidal gear, wherein:

the backlash satisfies $\Delta c=(0.7\text{-}5)\lambda$ (mm) between the pin (4) and the tooth socket of each cycloidal gear, where: $\lambda$ denotes a thermal expansion amount of the cycloidal gears when the reducer does work under a rated torque: $\lambda=(d_0\Delta_t)\alpha_t=0.00062d_0$ (mm), a thermal expansion coefficient of bearing steel satisfies $\alpha_t=1.379\cdot 10^{-5}$ (1/° C.), $d_0$ is an average diameter of the cycloidal gears, and a temperature rise satisfies $\Delta_t=45°$ C.; and the cycloidal gears are modified by the positive equidistant-positive radial moving combination, and a return difference formed by modification based on the positive equidistant-positive radial moving combination is reduced to satisfy a design requirement according to an anti-backlash principle.

2. The reducer for high precision control according to claim 1, wherein the backlash satisfies $\Delta c=0.7\lambda$ (mm) between the pin (4) and the tooth socket of each cycloidal gear.

3. The reducer for high precision control according to claim 1, wherein the third bearing (2) is a single-row radial thrust ball bearing with sealing or a thin-wall seal four-point contact ball bearing or a thin-wall seal crossed roller bearing.

* * * * *